United States Patent [19]

Zerrer

[11] Patent Number: 4,662,158
[45] Date of Patent: May 5, 1987

[54] BRUSHCUTTER HAVING A STARTER ARRANGEMENT

[75] Inventor: Gerhard Zerrer, Korb, Fed. Rep. of Germany

[73] Assignee: Andreas Stihl, Waiblingen, Fed. Rep. of Germany

[21] Appl. No.: 713,383

[22] Filed: Mar. 18, 1985

[30] Foreign Application Priority Data

Mar. 24, 1984 [DE] Fed. Rep. of Germany ....... 3410966

[51] Int. Cl.[4] ............................................. A01D 34/67
[52] U.S. Cl. ....................................... 56/12.7; 30/276; 123/185 A
[58] Field of Search ................... 56/12.7, 10.5; 30/276; 123/185 A, 185 B, 185 AB; 15/405, 410, 344

[56] References Cited

U.S. PATENT DOCUMENTS

| | | | |
|---|---|---|---|
| 1,147,424 | 7/1915 | Needham | 123/185 B |
| 1,209,913 | 12/1916 | Watson | 123/185 B |
| 2,723,655 | 11/1955 | Shimanckas | 123/185 BA |
| 2,742,887 | 4/1956 | Ade et al. | 123/185 BA |
| 2,912,966 | 11/1959 | Mitchell | 123/185 A |
| 2,999,491 | 9/1961 | Harkness | 123/185 A |
| 3,252,452 | 5/1966 | Burkett et al. | 123/185 A |
| 3,453,732 | 7/1969 | Wilkin | 30/276 |
| 3,781,991 | 1/1974 | Stretton | 30/276 |
| 4,006,528 | 2/1977 | Katsuya | 30/276 |
| 4,109,538 | 8/1978 | Glenday et al. | 123/185 A |
| 4,226,021 | 10/1980 | Hoff | 464/52 |
| 4,286,678 | 9/1981 | Tuggle | 15/405 |
| 4,404,706 | 9/1983 | Loyd | 15/405 |
| 4,571,831 | 2/1986 | White, III | 56/12.7 |

Primary Examiner—Paul J. Hirsch
Attorney, Agent, or Firm—Walter Ottesen

[57] ABSTRACT

The invention is directed to a starter arrangement for a brushcutter which is driven by an engine mounted in a housing and secured to the one end of a carrying tube. A shaft accommodated in the carrying tube couples the engine to a transmission of a cutting tool provided at the other end of the carrying tube. The drive shaft is operatively connected with the starter arrangement which includes a starter grip. The starter grip is provided on the carrying tube within convenient reach of the operator. The brushcutter is suspended from the shoulder during use and can be started simply and readily by the operator without having to first take off the brushcutter or otherwise change its position.

11 Claims, 2 Drawing Figures

BRUSHCUTTER HAVING A STARTER ARRANGEMENT

FIELD OF THE INVENTION

The invention relates to a brushcutter having a starter arrangement. The starter arrangement includes a take-up roller operatively connected to the drive shaft of the brushcutter. A starter cord is wound on the take-up roller and has a starter grip attached to its free end.

BACKGROUND OF THE INVENTION

In a known brushcutter, the starter grip is located on the rear side of the engine housing remote from the cutting tool. In operation, the operator wears the brushcutter suspended by a shoulder strap and guides the same on the carrying grip, so that the engine is rearward and the cutting tool forward of the operator's body. In this operating position, it is not possible for the operator to actuate the starter grip, at least not without danger and twisting the body. Therefore, the brushcutter often has to be taken down from the shoulder for starting. Since the brushcutter is frequently used on difficult terrain and in the brush, the cutting tool may easily jam when cutting vegetation that is difficult to cut or the cutting tool may become caught in the brush thereby causing the engine to stall. In these situations, the nature of the terrain can make it difficult to move the brushcutter into a position in which the starter grip is readily accessible. To preclude any danger for the operator, such a position change requires that the engine be first turned off.

SUMMARY OF THE INVENTION

It is an object of the invention to provide a brushcutter of the above-mentioned type which can be readily started when in the suspended operating position.

The starter arrangement of the brushcutter of the invention is for a brushcutter which includes a housing for accommodating a drive engine therein and a carrying tube which has one end thereof connected to the housing. A cutting tool and transmission assembly is mounted at the other end of the carrying tube and connected to the engine by means of a drive shaft mounted in the carrying tube. A carrying handle is disposed between the housing and the assembly for enabling an operator to guide the brushcutter during brushcutting work.

The starter arrangement of the brushcutter of the invention includes a take-up roller mounted in the housing and operatively connected to the drive shaft; a starter cord wound on the take-up roller; a starter grip attached to the free end of the starter cord; and, starter grip mounting means for accommodating the starter grip thereon, the mounting means being disposed at a location on the carrying tube so as to place the starter grip within easy reach of the operator of the brushcutter while holding the same in its operating position.

In the starter arrangement of the brushcutter of the invention, the starter grip is forward of the operator's body when the brushcutter is in the operating position thereby enabling the operator to see and grasp the starter grip easily even under adverse conditions on difficult terrain. As a result, the operator can easily pull the starter grip upwardly away from the carrying tube while the brushcutter is suspended from the shoulder without the need to twist the body or bring the brushcutter into another position. In this manner, the brushcutter tool can be restarted simply and rapidly, even if the engine stalls or is turned off frequently, which makes working with the tool extremely easy and convenient. Apart from the starter grip of the invention, the engine housing requires no additional rearward starter grip so that no extra cost is incurred.

Further features of the invention will become apparent from the subsequent description, the drawing and the appended claims.

BRIEF DESCRIPTION OF THE DRAWING

The invention will now be described in more detail with reference to the drawing wherein.

DESCRIPTION OF THE PREFERRED EMBODIMENTS OF THE INVENTION

Figure 1:
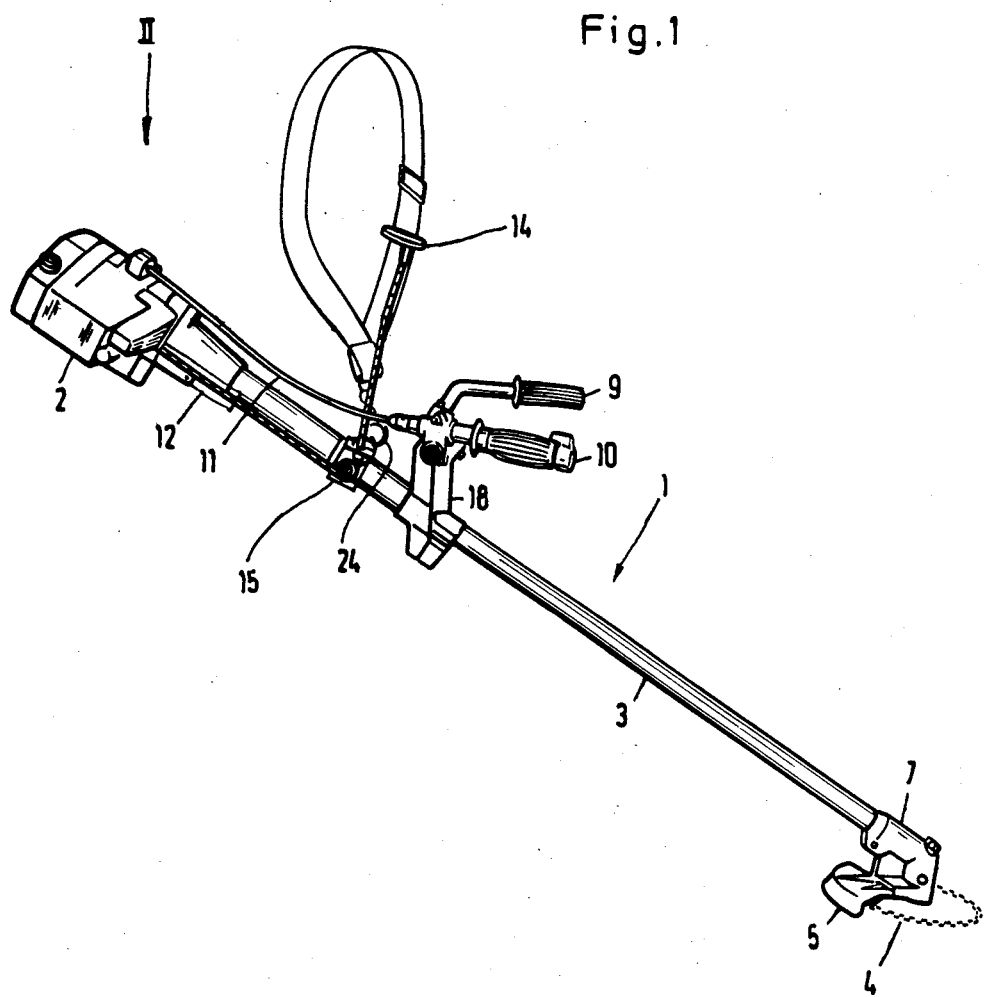
FIG. 1 is a perspective view of the brushcutter of the invention equipped with a starter arrangement of the invention shown in the operating position as the engine is being started; and, FIG. 2 is an enlarged view of a portion of the brushcutter of FIG. 1 indicated by arrow II in FIG. 1.
Figure 2:
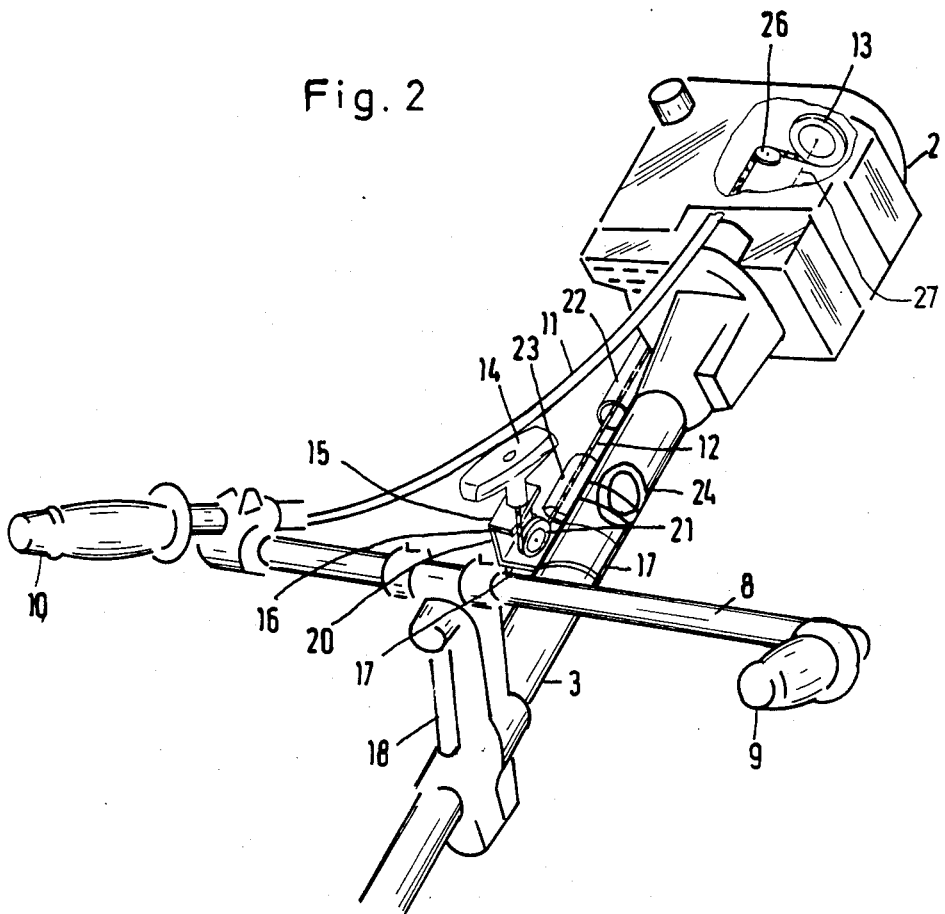

The brushcutter of FIGS. 1 and 2 includes an engine (not shown) mounted in an engine housing 2 and secured to the one end of a carrying tube 3. Arranged at the other end of the carrying tube is a cutting tool 4 configured as a brush knife or circular cutting blade, for example. The cutting tool is guarded by a safety shield 5 disposed rearwardly in the direction of the engine housing 2 or the operator 6 in order to protect the operator from injury. The carrying tube 3 accommodates a shaft (not shown) having its one end coupled to a crankshaft (not shown) of the engine and its other end to a transmission (not shown). The transmission is mounted in a transmission housing 7 and has a drive shaft (not shown) extending out of the transmission housing for driving the cutting tool 4. About half way between engine housing 2 and transmission housing 7, a handlebar 8 (FIG. 2) including two handles 9 and 10 is secured to carrying tube 3. The one handle 10 is rotatable to open the throttle and is linked to a throttle lever (not shown) of the engine via a cable 11 in a known manner.

To start the engine, a starter cord 12 is provided which has its one end fastened to a starter cord take-up roller 13 (FIG. 2) mounted in the engine housing 2. In the inactive or rest position, the starter cord 12 is wound on the take-up roller 13. A return spring (not shown) acts on take-up roller 13 causing it to rotate in the wind-up direction thereby rewinding the starter cord 12 after starting the engine. The starter cord take-up roller 13 is mounted on a starter shaft represented schematically by axis 27 in FIG. 2 and is adapted to be coupled to the engine drive shaft (not shown) in a known manner. A pulley 26 is mounted in the engine housing 2 so as to be freely rotatable and changes the direction of movement of the starter cord 12.

A starter grip 14 is secured to the free end of the starter cord 12. When starting the engine, the grip 14 is pulled upwardly thereby pulling the cord into the extended position shown in FIG. 1. Starter grip 14 is arranged so that it extends upwardly over the carrying tube 3 in the operating position shown in FIG. 1 and is therefore easily accessible by the operator. In this position, the starter grip 14 rests conveniently against a leg 15 of a U-shaped bracket 16 connected to a clip 17 mounted on the tube (FIG. 2). Clip 17 is fixedly attached to the carrying tube 3 between the engine housing 2 and a handlebar mounting bracket 18 seated on carrying tube 3.

In the operating position, leg 15 of bracket 16 is above and parallel to carrying tube 3; whereas, the other leg 17 is slightly below the carrying tube and connected with clip 17.

In order to change the direction of movement of the end portion of starter cord 12 at which starter grip 14 is attached upwardly into the position shown in FIGS. 1 and 2, a pulley 21 is rotatably mounted on the transverse segment 20 of bracket 16 between its two legs 15 and 19. Starter cord 12 extends through an opening in leg 15 against which the starter grip 14 rests in its inactive position (FIG. 2). To prevent the starter cord 12 from being caught in branches or the like, it is guidingly accommodated at least partially in one, preferably two, protective tubes 22 and 23 arranged one behind the other in the longitudinal direction of carrying tube 3. The protective tubes are secured to carrying tube 3 with a small spacing therebetween as shown.

As shown in FIG. 1, carrying tube 3 also includes an eyelet 24 to which an adjustable-length shoulder strap 25 is fastened which an operator may wear suspended from the shoulder when operating the brushcutter 1. To guide the cutting tool 4, the brushcutter is held by the two handles 9 and 10. When starting, only handle 9 is held. With the other hand, the operator grasps the starter grip 14 and pulls it swiftly in the upward direction. This will cause starter cord 12 to unwind from roller 13 and start the engine. The starter grip 14 is then released, causing starter cord 12 to rewind automatically onto roller 13 which rotates back into its rest position by the force of its return spring.

It is understood that the foregoing description is that of the preferred embodiments of the invention and that various changes and modifications may be made thereto without departing from the spirit and scope of the invention as defined in the appended claims.

What is claimed is:

1. A brushcutter driven by an engine and supported by the operator with a body strap during the operation thereof, the brushcutter comprising:
   a housing for accomodating the engine therein;
   a carrying tube having a rearward end connected to said housing and having a forward end;
   a cutting tool assembly mounted on said forward end;
   a drive shaft mounted in said carrying tube for connecting the engine to said cutting tool assembly;
   body strap attachment means for attaching the body strap to the carrying tube at a location thereon so as to place said housing rearward of the operator's body and said cutting tool assembly forward of the operator's body when the brushcutter is in use by the operator;
   a carrying and manipulating handle disposed on said carrying tube between said housing and said cutting tool assembly so as to place the same forward of the operator's body and in a position to permit the operator to hand-hold and manipulate the brushcutter during use thereof;
   a starter arrangement for starting the engine, the starter arrangement including:
   a take-up roller mounted in said housing and operatively connected to said drive shaft;
   a starter cord wound on said take-up roller;
   a starter grip attached to the free end of said starter cord; and,
   starter grip mounting means for accomodating said starter grip thereon, said mounting means being disposed forward of said housing and associated with said carrying tube at a location so as to place said starter grip within easy reach of the operator while holding the brushcutter in its operating position.

2. The brush cutter of claim 1, said starter grip mounting means being secured to said carrying tube so as to be disposed in the immediate vicinity of said carrying handle between the latter and said housing.

3. The brushcutter of claim 1, said starter arrangement further including guide means for guiding said starter cord to said mounting means in a direction substantially parallel to said carrying tube.

4. The brushcutter of claim 3, said guide means being arranged next to said carrying tube for guiding said starter cord directly next to said carrying tube in the region outside of said housing.

5. The brushcutter of claim 4, said guide means comprising a protective tube fixedly attached to said carrying tube for guiding said starter cord between said take-up roller and said mounting means.

6. The brushcutter of claim 4, said guide means comprising a plurality of protective tube segments disposed one behind the other for guiding said starter cord between said take-up roller and said mounting means, said protective tube segments being fixedly attached to said carrying tube.

7. The brushcutter of claim 4, said starter arrangement including pulley means arranged outside of said housing for changing the direction of movement of said starter cord from said guide means into said mounting means.

8. The brushcutter of claim 7, said mounting means comprising a bracket for holding said starter grip in its rest position, said bracket being fixedly attached to said carrying tube, said pulley means being a pulley mounted on said bracket so as to be freely rotatable with respect thereto.

9. The brushcutter of claim 8, said bracket being a U-shaped bracket; and, said mounting means further comprising a tube clip for fixedly attaching said bracket to said carrying tube.

10. The brushcutter of claim 9, one of the legs of said U-shaped bracket having an opening formed therein for permitting passage of said starter cord therethrough, said opening being dimensioned so as to permit said starter grip to abut against said one leg when said starter cord is in its rest position.

11. The brushcutter of claim 10, said bracket being dimensioned to cause said one leg thereof to project above said carrying tube so as to place said starter grip at an elevation corresponding approximately to the elevation of said carrying handle.

* * * * *